United States Patent
Pan et al.

(10) Patent No.: US 7,454,534 B2
(45) Date of Patent: Nov. 18, 2008

(54) INPUT CIRCUIT SHARED BY MULTI SIGNAL SOURCES

(75) Inventors: Chun-Wei Pan, Guangdong (CN);
Han-Che Wang, Guangdong (CN);
Chen-Hsuan Ho, Guangdong (CN);
Shin-Hong Chung, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 120 days.

(21) Appl. No.: 11/564,835

(22) Filed: Nov. 29, 2006

(65) Prior Publication Data
US 2007/0233911 A1 Oct. 4, 2007

(30) Foreign Application Priority Data
Dec. 17, 2005 (CN) .................... 2005 1 0120965

(51) Int. Cl.
*G06F 3/00* (2006.01)
*G06F 1/00* (2006.01)
(52) U.S. Cl. ............... 710/48; 710/15; 710/62; 710/72; 713/323
(58) Field of Classification Search ........... 710/14–19, 710/48–51, 62–64, 72–73, 260–269; 713/300–323
See application file for complete search history.

(56) References Cited

U.S. PATENT DOCUMENTS

| | | | | |
|---|---|---|---|---|
| 5,640,571 A | * | 6/1997 | Hedges et al. | 710/261 |
| 5,842,028 A | * | 11/1998 | Vajapey | 713/310 |
| 5,883,446 A | | 3/1999 | Yuth | |
| 6,009,495 A | * | 12/1999 | DeRoo et al. | 711/103 |
| 6,192,425 B1 | * | 2/2001 | Sato | 710/48 |
| 6,256,746 B1 | * | 7/2001 | Cheng | 713/600 |
| 6,272,645 B1 | | 8/2001 | Wang | |

* cited by examiner

*Primary Examiner*—Christopher B. Shin
(74) *Attorney, Agent, or Firm*—Winston Hsu

(57) ABSTRACT

An input circuit shared by multi signal sources each of which outputting a type of signals includes a processing unit (10). The processing unit includes a plurality of input pins (11) and an interrupt pin (12), each of the input pins connecting with one or more of the signal sources and receiving signals from the signal sources. The input circuit further includes a tristate buffer (30) The tristate buffer includes an enable pin (33) enabling the tristate buffer upon receiving an enable signal, a plurality of input pins (31) connecting with one or more of the signal sources and receiving signals from the signal sources, and a plurality of output pins (32) connecting with the interrupt pin of the processing unit and producing an interrupt signal to the interrupt pin according to the signals received at the input pins. A related wake-up signal input circuit is also provided.

8 Claims, 2 Drawing Sheets

INPUT CIRCUIT SHARED BY MULTI SIGNAL SOURCES

TECHNICAL FIELD

The present invention relates to input circuits, and particularly to an input circuit shared by multi signal sources.

RELATED ART

For most electronic devices, a result is produced regardless of different inputs thereto, a typical example is to wake-up a "dormant" computer. A user can press any key of a keyboard of the "dormant" computer, or move a mouse of the "dormant" computer to wake up the "dormant computer."

A traditional way of producing a same result utilizing different inputs is relatively complex. Specifically, the traditional way is to employ a plurality of gate circuits and switching circuits. The gate circuits are connected with the inputs and the switching circuits are connected with an interrupt pin of a processing unit. Each gate circuit drives the switching circuit connected therewith to switch on upon receiving an input and produces an interrupt signal to the interrupt pin. The interrupt signal causes the processing unit to execute a corresponding program.

Therefore, there is a need for providing an input circuit shared by multi signal sources which has a relatively simple configuration.

SUMMARY

An input circuit shared by multi signal sources is provided in accordance with a preferred embodiment, each of the signal sources outputting a type of signals. The input circuit includes: a processing unit, including a plurality of input pins and an interrupt pin, each of the input pins connecting with one or more of the signal sources and receiving signals from the signal sources; and a tristate buffer. The tristate buffer includes an enable pin enabling the tristate buffer upon receiving an enable signal, a plurality of input pins connecting with one or more of the signal sources and receiving signals from the signal sources, and a plurality of output pins connecting with the interrupt pin of the processing unit and producing an interrupt signal to the interrupt pin according to the signals received at the input pins.

A wake-up signal input circuit shared by multi signal sources is also provided, each of the signal sources outputting a type of signals. The wake-up signal input circuit includes a processing unit, including a plurality of input pins and a wake-up interrupt pin, each of the input pins connecting with one or more of the signal sources and receiving signals from the signal sources, the interrupt pin receiving a wake-up interrupt signal and causing the processing unit to execute an wake-up interrupt program. The wake-up signal input circuit further includes a tristate buffer. The tristate buffer includes an enable pin enabling the tristate buffer upon receiving an enable signal, a plurality of input pins connecting with one or more of the signal sources and receiving signals from the signal sources, and a plurality of output pins connecting with the wake-up interrupt pin of the processing unit and producing an wake-up interrupt signal to the interrupt pin according to the signals received at the input pins.

Other advantages and novel features will be drawn from the following detailed description with reference to the attached drawings, in which:

DETAILED DESCRIPTION OF THE EMBODIMENTS

Figure 1:
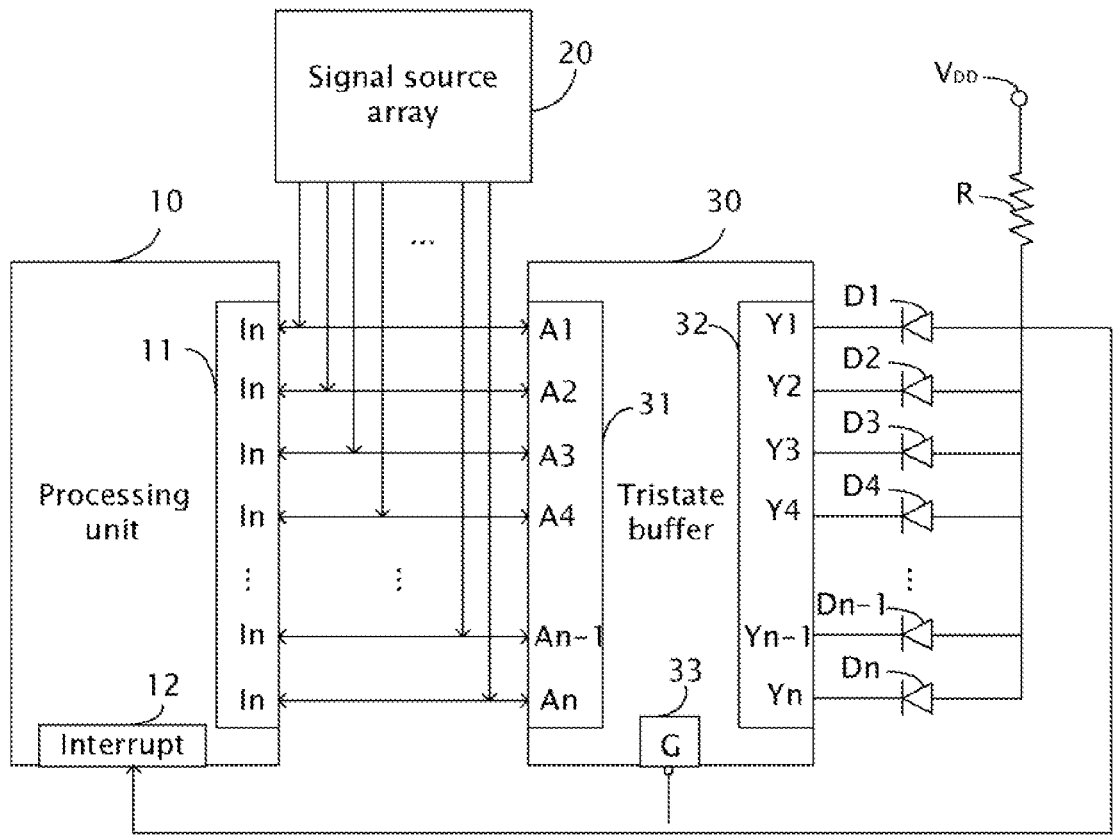
FIG. 1 depicts an exemplary block diagram of an input circuit shared by multi signal sources in accordance with a preferred embodiment of the present invention.

Referring to FIG. 1, an exemplary block diagram of an input circuit shared by multi signal sources (hereinafter simplified as "the shared input circuit") in accordance with a preferred embodiment of the present invention is shown. A signal source array 20 is connected to a processing unit 10 and a tristate buffer 30, and used to produce and transmit signals simultaneously to the processing unit 10 and the tristate buffer 30. The signal source array 20 includes a plurality of signal sources, each outputting a type of signals to the processing unit 10 and the tristate buffer 30. The processing unit 10 includes a plurality of input pins (In) 11, each connecting with one or more of the signal sources of the signal source array 20. The processing unit 10 also includes an interrupt pin 12. The interrupt pin 12 is configured to receive an interrupt signal from the tristate buffer 30 and triggers the processing unit 10 to execute an interrupt program in accordance with the interrupt signal.

The tristate buffer 30 includes a plurality of input pins (A1~An) 31 and an equal number of output pins (Y1~Yn) 32. The input pins 31 each connects with one or more of the signal sources and the output pins 32 each connects with an unidirectional conducting unit that is shown as diodes D1~Dn. Each of the unidirectional conducting units is connected to a voltage source VDD via a resistance component R, forms a node A with the resistance component R, and conducts current flowing from the voltage source VDD to the output pin 32 connected therewith when the output pin 32 experiences a sufficient voltage drop relative to the voltage source VDD. The conduction from the Voltage source VDD to the output pin 32 produces the interrupt signal at the node A to the interrupt pin 12 of the processing unit 10. The tristate buffer 30 further includes an enable pin 33, in this embodiment, the enable pin 33 is an active low enable pin (G) 33 that is connected with a control device (not shown). The control device transmits low level enable signals to the enable pin 33 and enables the tristate buffer 30.

Figure 2:
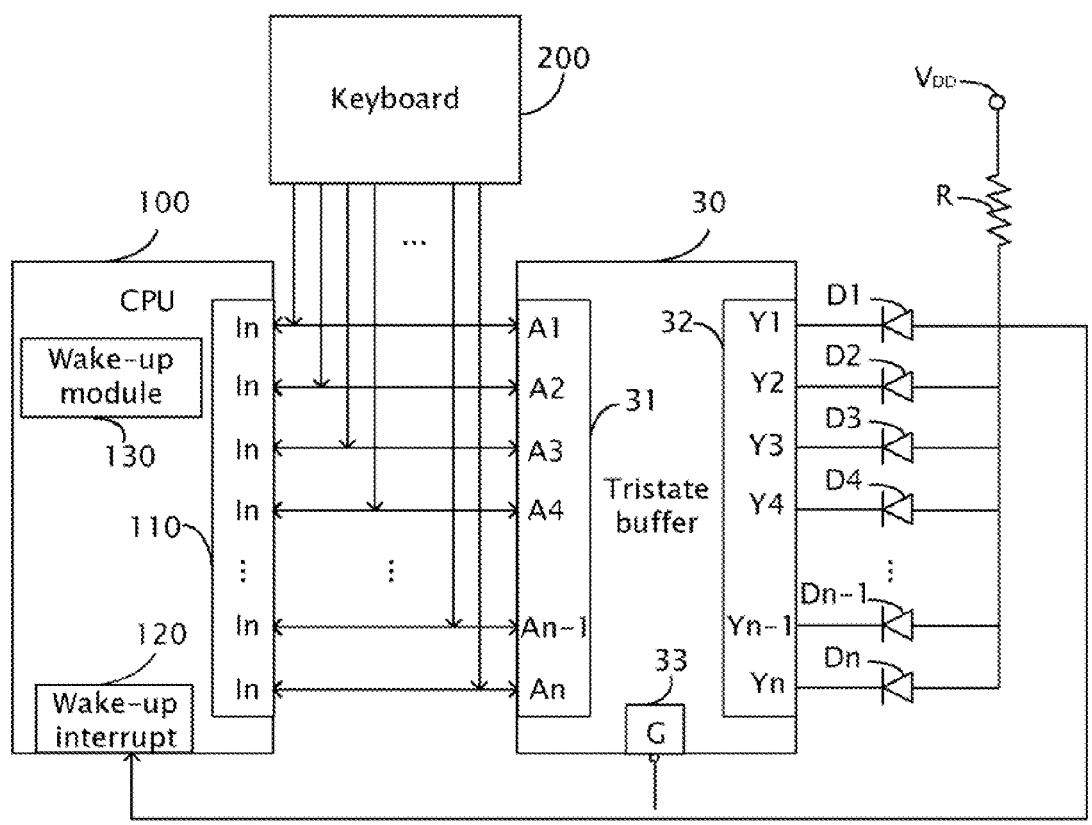
FIG. 2 depicts an exemplary application of the shared signal input circuit of FIG. 1.

Referring to FIG. 2, an exemplary application of the shared input circuit of FIG. 1 is shown. In this application, the shared input circuit is employed to wake up a "dormant" computer according to key signals from a keyboard connected with the "dormant" computer. Here, the signal source array 20 is embodied as a keyboard 200 that is connected with the "dormant" computer, and the processing unit 10 is embodied as a CPU 100 including a wake-up module 130 and embedded in the "dormant" computer.

The CPU 100 receives a wake-up interrupt signal from the tristate buffer 30 via the wake-up interrupt pin 120 and wakes up the "dormant" computer according the wake-up interrupt signal. Thus, if a user reuses the "dormant" computer, the user can press any key of the keyboard 200 and produce a key signal to both one of the input pins (In) 110 of the CPU 100 and one of the input pins 31 (e.g., the input pin A1). The key signal is transmitted by the input pin 31 (e.g., the input pin A1) to a corresponding one of the output pins 32 (e.g., the output pin Y1) and pulls down a potential at the corresponding output pin 32 (e.g., the output pin Y1). A sufficient voltage drop from the voltage source VDD to the corresponding output pin 32 (e.g., the output pin Y1) is consequentially produced, causing that the conduction from the voltage source VDD to the corresponding output pin 32 (e.g., the output pin Y1) is established. The node A changes from a high level potential to a low level potential and produces a low level wake-up interrupt signal to the wake-up interrupt pin 120. The CPU 100 receives the wake-up interrupt signal at the wake-up interrupt pin 120 and accordingly wakes up the "dormant" computer.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An input circuit shared by multi signal sources each of which outputs a corresponding type of signal, the input circuit comprising:
    a processing unit, comprising a plurality of input pins and an interrupt pin, each of the input pins connecting with one or more of the signal sources and receiving signals from the signal sources;
    a tristate buffer, comprising an enable pin enabling the tristate buffer upon receiving an enable signal, a plurality of input pins connecting with one or more of the signal sources and receiving signals from the signal sources, and a plurality of output pins connecting with the interrupt pin of the processing unit and producing an interrupt signal to the interrupt pin according to the signals received at the input pins.

2. The input circuit as claimed in claim 1, further comprising a plurality of unidirectional conducting units, each of which is connected between one of the output pins of the tristate buffer and a voltage source via a resistance component, and forms a node with the resistance component.

3. The input circuit as claimed in claim 2, wherein the node is connected to the interrupt pin of the processing unit.

4. The input circuit as claimed in claim 3, wherein the tristate buffer transmits the signals received at the input pins thereof to the corresponding output pins, which causes electrical conductions from the voltage source to the corresponding output pins, thereby producing the interrupt signal at the node.

5. A wake-up signal input circuit shared by multi signal sources each of which outputs a corresponding type of signal, the wake-up signal input circuit comprising:
    a processing unit, comprising a plurality of input pins and a wake-up interrupt pin, each of the input pins connecting with one or more of the signal sources and receiving signals from the signal sources; the interrupt pin receiving a wake-up interrupt signal and causing the processing unit to execute a wake-up interrupt program;
    a tristate buffer, comprising an enable pin enabling the tristate buffer upon receiving an enable signal, a plurality of input pins connecting with one or more of the signal sources and receiving signals from the signal sources, and a plurality of output pins connecting with the wake-up interrupt pin of the processing unit and producing the wake-up interrupt signal to the interrupt pin according to the signals received at the input pins.

6. The input circuit as claimed in claim 5, further comprising a plurality of unidirectional conducting units, each of which being connected between one of the output pins of the tristate buffer and a voltage source via a resistance component, and forming a node with the resistance component.

7. The input circuit as claimed in claim 5, wherein the node is connected to the wake-up interrupt pin of the processing unit.

8. The input circuit as claimed in claim 6, wherein the tristate buffer transmits the signals received at the input pins thereof to the corresponding output pins, which causes electrical conductions from the voltage source to the corresponding output pins, thereby producing the wake-up interrupt signal at the node.

* * * * *